United States Patent [19]

Gotthard

[11] 4,120,745
[45] Oct. 17, 1978

[54] SEMI-CONTINUOUS VACUUM PAN SYSTEM

[75] Inventor: Detre Gotthard, Sydney, Australia

[73] Assignee: CSR Limited, Sydney, Australia

[21] Appl. No.: 719,083

[22] Filed: Aug. 31, 1976

[30] Foreign Application Priority Data

Sep. 1, 1975 [AU] Australia .................... PC 2997

[51] Int. Cl.² ................................... B01D 1/06
[52] U.S. Cl. ........................... 159/27 B; 159/270;
159/45; 159/DIG. 16; 159/47 R; 159/18;
127/16; 422/245
[58] Field of Search .............. 159/45, 18, 27 R, 27 A,
159/27 B, 27 D, 27 E, 27 F, 44, 47 R, DIG. 38;
23/273 MT, 295 R; 127/16, 61

[56] References Cited

U.S. PATENT DOCUMENTS

| 626,971 | 6/1899 | Craney | 159/18 |
|---|---|---|---|
| 1,021,486 | 3/1912 | Rusiecki | 159/18 |
| 1,548,063 | 8/1925 | Ray et al. | 159/17 R |
| 1,783,464 | 12/1930 | Follain | 159/18 R |
| 3,010,805 | 11/1961 | Cheng | 159/45 X |
| 3,417,001 | 12/1968 | Fletcher | 159/18 R |
| 3,469,617 | 9/1969 | Palmason | 159/44 |
| 3,627,582 | 12/1971 | Dambrine et al. | 127/16 |
| 3,680,621 | 8/1972 | Giorgi et al. | 127/16 X |
| 3,899,386 | 8/1975 | Komiyama et al. | 159/45 X |

*Primary Examiner*—Norman Yudkoff
*Attorney, Agent, or Firm*—Emory L. Groff, Jr.

[57] ABSTRACT

This invention pertains to a low head semi-continuous vacuum pan system for crystallization of a substance from solution of the substance, including the crystallization of a sugar from a sugar solution, that includes a sequential array of individual vacuum pans, wherein each pan has an associated discharge volume and the array is formed by positioning each pan so that its discharge volume is greater than the discharge volume of the immediately preceding pan and wherein heat and top-up solution are supplied to each pan and periodically all the contents of each pan are transferred to an immediately following pan and wherein controls are used to insure that the transfer takes place when the volume of each pan's contents reaches its associated discharge volume and the controls preferably ensure that each pan is empty before it receives the contents of the immediately preceding pan. This invention also pertains to a method of crystallizing a substance from a solution of the substance.

12 Claims, 2 Drawing Figures

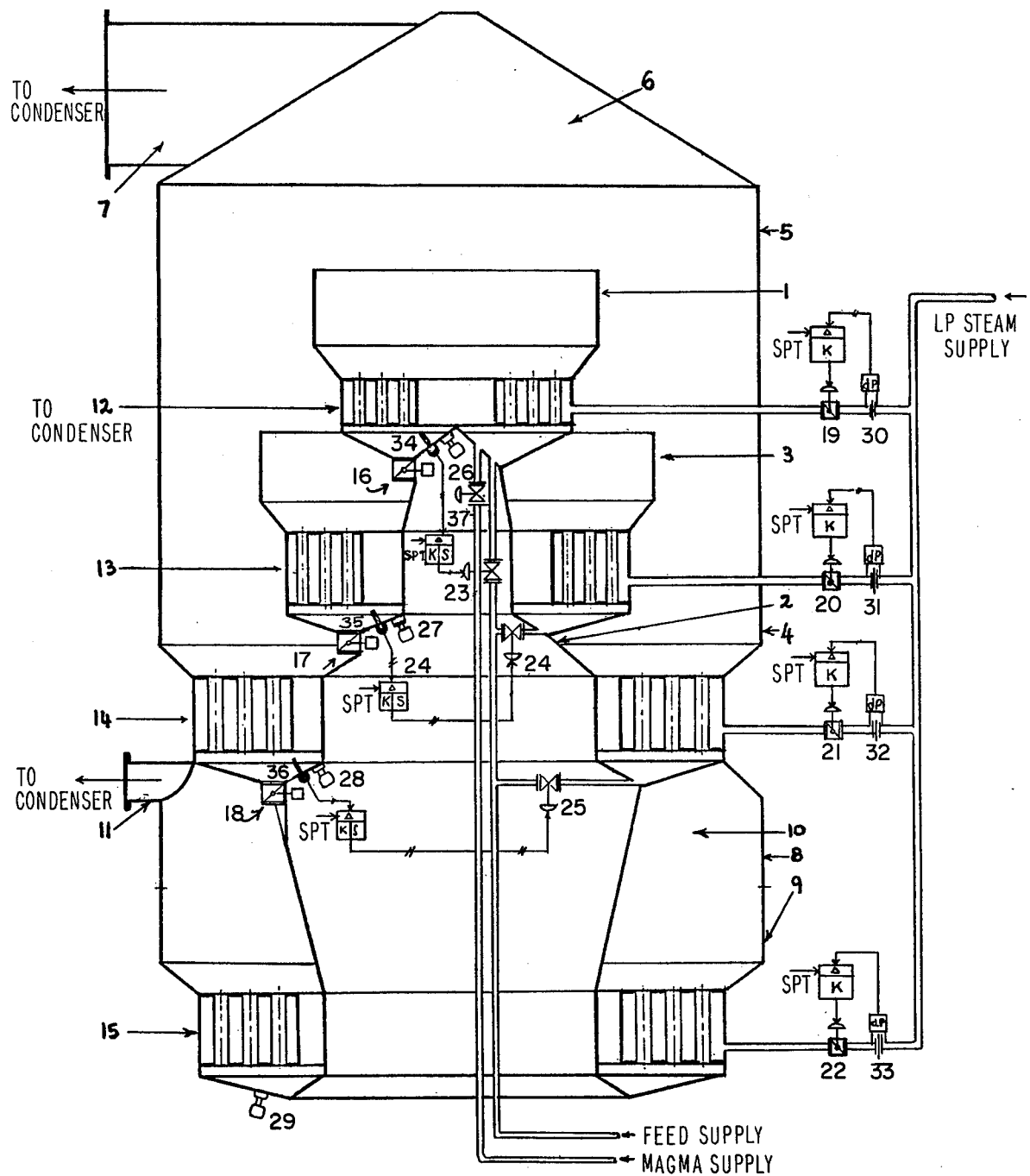

SEMI-CONTINUOUS VACUUM PAN SYSTEM

The present invention deals generally with crystallisation of a substance from a solution of the substance using vacuum pans and overcomes prior art problems associated with solution head and variations in crystal size.

In particular our invention provides a low head semi-continuous vacuum pan system that includes a sequential array of individual vacuum pans. Each pan has an associated discharge volume, said discharge volume being measured as discharge levels of solution head in each pan, and the array is formed by positioning each pan so that its discharge volume is greater than the discharge volume of an immediately preceeding pan. Heat and top-up solution are supplied to each pan and periodically all the contents of each pan are transferred to an immediately following pan. Controls may be used to regulate the supplies of heat and top-up solution to ensure that the transfer takes place when the volume of each pan's contents reaches its associated discharge volume and the controls preferably ensure that each pan is empty before it receives the contents of the immediately preceeding pan.

In a particular embodiment of our invention each pan has a total volume that is greater than the total volume of an immediately preceeding pan and the abovementioned discharge volumes are identified as discharge levels of solution head in each pan.

Our invention also includes the method associated with the above description of the system and is as described hereinafter.

From the above it is seen that our invention is not limited to the crystallisation of any particular substance; it is believed however that our invention is particularly useful when the substance is sugar and the preferred embodiment is described in respect to the crystallisation of sugar from a solution.

To fully understand the problems associated with prior art vacuum pans the following general description of crystallisation is briefly given.

Consider a crystal immersed in a solution to which heat is being applied and being carried by convection currents in some geometric path. As the crystal moves on this path its size will change according to its velocity and the supersaturation coefficient of the solution along this path; its velocity is related to solution viscosity which in turn is related among other things to the concentration of the substance in solution and the temperature of the solution; the supersaturation coefficient is related to the above concentration and the temperature which in turn is related to the pressure head of the solution at the particular point under consideration. It is thus seen that the change in crystal size at a particular point is a function, which we will call the instantaneous growth function, of at least the temperature and the concentration, and the final crystal size is the sum of all the size changes added by the instantaneous growth function along the total path; final size thus depends on the instantaneous growth function and path length.

As crystals grow the concentration decreases and the growth rate consequently decreases. While the decrease in concentration due to crystal growth is partly countered by evaporation nevertheless extra solution at the original concentration has to be added in an attempt to continue crystal growth. The addition of this extra solution of course increases the level, or head, of the solution.

The above increase in head leads, however, to problems associated with an increase in the length of the crystal path within one cycle and with a decrease in the driving force that causes the crystals to move along their paths. These problems are discussed briefly below.

Crystals immersed in a heated solution move in cyclic paths and, in particular when in a calandria vacuum pan, they move up through the tubes of the calandria and return to the bottom of the pan through the "downtake". As indicated previously the instantaneous growth function is related to at least the temperature and the concentration which in turn are related to the pressure head of the solution. Thus, the instantaneous growth function along a cyclic path will vary in a cyclic manner being a maximum generally in the vicinity of the solution surface and a minimum near the bottom of the pan and we see that as the head increases the difference between maximum and minimum values that the function takes also increases. Now a wide range in values gives rise to a problem of uneven growth rates and in extreme cases a value that is too high can produce false grain formation. To avoid false grain formation the pan has to be designed and worked such that the instantaneous growth function is held below a predetermined safe value and in these circumstances maximum growth rates cannot be achieved.

The second of the problems deals with the driving force that produces the natural circulation in a heated solution and is directly related to the rate at which heat can be transferred to the solution from a heating wall. This heating rate is proportional to the product of temperature difference between the wall and the solution and area of wall that is emitting the heat. The constant of proportionality is called the heat transfer coefficient and is related to many variables; the variable in the present instance of particular importance being the velocity of the solution which decreases as the flow resistance along the cyclic path increases with increasing head. The increased head thus will reduce the heat transfer coefficient which will (further) decrease the driving force and consequentially slow down the entire crystallisation process.

In one attempt to solve the above problems mechanical mixers are used to try to produce a more uniform distribution of instantaneous growth functions and to increase the driving force. These attempts, however, are not completely successful because they do not overcome the difficulty of greater cycle paths mentioned earlier. The physical introduction of mixers also increases costs (due to the power required to prevent heat transfer limiting conditions) and adds other complications.

In another attempt to solve the problem there has been evolved another prior art pan called the continuous vacuum pan. In this pan a series of horizontal compartments is formed in a long trough by partitions having heights such that there is an overflow or underflow from one compartment to the next compartment. In each compartment there is a calandria heating means the height of which is such that solution boiling from the top flows across the adjoining partition into the next compartment. The pan system thus formed holds the average growth function very constant since there is very little head above the calandrias. The system however introduces another problem because the system does not control the path length; in practice many crystals remain cycling in a compartment having a particular growth function while the majority of crystals overflow quickly into the next compartment having a different growth function — the remaining crystals thus have longer path lengths than the overflow crystals. The result of such longer paths is that there is a large variation in size of the final crystals that is not acceptable for shipment sugars.

We overcame the dual problems associated with path length and driving force by providing the previously described low head semi-continuous vacuum pan system in which all the contents of each pan is transferred into an immediately following pan in the array, and we further overcame came the driving force problem by providing heat to the contents of each pan at a rate that is related to the maximum size of the crystals to be grown therein; since pan volume is also related to this maximum size it follows that heating rate is related to pan volume.

As indicated earlier the above problems are also overcome by the method associated with our invention in which a mixture of crystals and solution of a substance forms the contents of a number of vacuum pans, each pan having an associated discharge volume and all pans being in a sequential array according to increasing discharge volumes, the method including: transferring into each pan all the contents from an immediately preceeding pan in the array; supplying heat to each of the contents at rates generally related to the discharge volumes; supplying top-up solution to each of the contents; measuring properties of each said contents and obtaining control parameters; transferring from each pan all its contents into an immediately following pan in the array when the contents in each pan reaches its discharge volume; and using the obtained control parameters to control the heat supplying, the top-up supplying, and the transferring so that each immediately following pan is empty before it receives said contents.

We have also discovered within the general scope of our invention that best performance can be achieved when there are specific relationships between the maximum size of the crystals growing in each pan and the pan's volume and heat supply means. This relationship in respect to the heat supply was briefly mentioned above and we have found the specific relationship to be that the heat supply means is to have a heating area that is proportional to the square of the maximum size. In respect to pan volume we have found the specific relationship to be that pan volume is to be proportional to the cube of the maximum size. We have incorporated these specific relationships in our preferred embodiment.

The continuous pan system also suffers from the additional defect that it is very expensive in respect to factory floor space and it may not be spacially possible for a factory using an older type vacuum pan with mechanical mixer to replace its older pan with a continuous pan.

We overcome this additional defect by providing as a preferred embodiment of our invention the previously described vacuum pan system with its sequential array in which said array comprises a vertical stack of pans, said means for transferring includes gravity discharge, and each pan has a total volume greater than the total volume of the pan immediately above in the stack.

Since it appears that the vertical stack will be of the order of forty feet high it is necessary that its design be such as to provide maximum stability; this stability is achieved in a further embodiment of our invention in which one or more of the pans are annular shaped troughs mounted in a vertical array on a common axis, preferably mounted on, or to form part of, the circumference of a central cone shaped compartment. The cone is standing on its base and is hollow to allow access to the inside and underside of the pans. It is seen that the volume of each successive pan increases with the diameter of the cone shaped compartment.

While the vacuum pans of our system can of course each be connected to a separate vacuum source it is seen that such connections would require additionally complicated controls; in a preferred embodiment of our invention we therefore provide all pans (except a final pan) with a common vapour space that is connected to a common vacuum source. The final pan is a heavy-up pan and is situated in a heavy-up compartment having a separate vapour space to enable its contents to be discharged to atmospheric conditions without breaking the vacuum in the other pans.

It is seen in the working of our invention that each pan should be empty before it receives the contents of an immediately preceeding pan; controls could therefore be incorporated to ensure such working. These controls include a means of measuring the concentration of sugar in solution in each pan and as the concentration falls due to crystallisation the controls operate the top-up solution supply means associated with each pan and fresh top-up solution of the original concentration is added. The controls also may operate the heat supply means associated with each pan and balance these means against the top-up solution supply means to ensure that the discharge volumes (and levels) in all the pans are reached either at the same time or in the correct sequence. When the discharge volumes (and levels) are reached the controls operate the means for transferring the pan contents to an immediately following pan. In the extreme control situation the transfer from each pan takes place as soon as the pan below is empty.

In our embodiment the above controls, because of their complexity, are fully automatic; it is probably desirable however that manual controls be also included to guard against break-downs or malfunction of automatic controls. Such conrols are well known and well understood by those skilled in the art and for this reason and for sake of ease of understanding the invention have not been described in detail.

The invention will now be particularly described in reference to the drawing which shows a schematic elevation cross section of a semi-continuous vacuum pan system having three individual pans. In this description the substance to be crystallised is sugar.

Pan 1 is an open circular cylinder positioned at the apex of a hollow cone shaped compartment 2 having a conventional butterfly discharge valve 16 in its bottom. Pans 3 and 4 are open circular annular shaped troughs of increasing diameter positioned around compartment 2 each having similar butterfly discharge valves 17 and 18, respectively.

Pans 1, 3 and 4 are housed in cylindrical main compartment 5 that provides a common vapour space 6 leading through a main vapour pipe 7 to a condenser (not shown). A vacuum pump (not shown) is connected to the condenser through a lined butterfly (on-off) valve in the conventional manner.

Positioned below main compartment 5 is a circular annular heavy-up compartment 8 containing a heavy-up pan 9 similar to the preceeding pans.

Heavy-up compartment 8 has a vapour space 10 that can be isolated from the common vapour space 6 and leads through a heavy-up vapour pipe 11 to a condenser (not shown). A vacuum pump (not shown) is connected to the condenser through a lined butterfly (on-off) valve 5 in the conventional manner.

Vacuum is continuously maintained and controlled in vapour space 6 with the aid of a conventional injection water control valve. In this vapour space vacuum is established and broken in the conventional manner at start ups and shut downs. In vapour space 10 vacuum is established and broken once every cycle also in the conventional manner.

Pans 1, 3, 4 and 9 have associated respectively therewith heat supply means that are steam calandrias 12, 13, 14 and 15, to which steam is supplied by steam pipes as shown. These calandrias each comprise the usual array of vertically aligned tubes. Each array of tubes is positioned adjacent the walls of its associated pan and since the diameters of pans 1, 3, and 4 increase progressively it is seen that the number of tubes per pan also increases progressively; ie the heat transfer area increases progressively.

The steam control to each calandria is controlled separately by butterfly valves 19, 20, 21 and 22, respectively and the measurement of steam flow is done with the aid of orifice plates connected to differential pressure transmitters, shown schematically as 30, 31, 32 and 33, respectively.

The feed supply means comprises conventional feed pipes as shown to the bottom of each of pans 1, 3 and 4 and includes control valves 23, 24 and 25, respectively that operate according to the electrical conductivity of the massecuite in the pans and to measure this conductivity each pan has a pair of electrodes and a conductivity measuring circuit, shown schematically as 34, 35 and 36, respectively.

The massecuite level in each pan is measured by conventional differential pressure (D.P.) cells 26, 27, 28 and 29, respectively and each pan has its own temperature indicator. The operation of the invention is described briefly as follows: Magma is fed into pan 1 via inlet feed pipe 37 to cover calandria 12 where it can be "conditioned" in the conventional way. After conditioning, if it is required, "boil-on" begins and top-up syrup or liquor is added to pan 1 by the feed supply means via the control valve 23 to counter the decrease in concentration resulting from crystal growth. During each cycle top-up syrup or liquor is also continuously added by control valves 24 and 25, respectively to pans 3 and 4.

When the level in pan 1 reaches a discharge level the D.P. cell sends a signal that operates butterfly valve 16 in the bottom of pan 1 and the massecuite is gravity dropped into pan 3; at the same time a fresh magma is fed in the conventional manner by inlet pipe 37 into pan 1 and a new cycle starts.

At the end of this cycle the massecuite from pan 3 is dropped into pan 4, massecuite from pan 1 is dropped into pan 3, and fresh magma is again fed to pan 1. The above sequence is again repeated and the massecuite in pan 4 drops into pan 9 of heavy-up compartment 8 where a heavy-up process takes place.

When the heavy-up process is completed vapour space 10 is isolated by means of the butterfly valves from the condenser; atmospheric conditions are then established in compartment 8 and the finished massecuite is dropped at the end of another cycle from pan 9 onto a distributor. Compartment 8 is then steamed and washed out before establishing the vacuum for the next cycle.

The above described cycles are controlled automatically by a logic system that monitors and controls the supply of steam, feed and vacuum such that the level in each pan is reached in the correct order and each pan is hence discharged in that order.

The above embodiment is intended only to illustrate one aspect of the present invention; it will be apparent to one skilled in the art that various modifications can be made to the invention without department from the spirit and scope thereof.

I claim:

1. A low head semi-continuous vacuumm pan system for crystallising a substance from its solution; said system including a sequential array of individual vacuum pans, each pan having associated therewith a discharge volume, said discharge volume being measured as discharge levels of solution head in each pan and each pan being positioned in said array so that each discharge volume is greater than the discharge volume of an immediately preceding pan, and each pan further having: a heat supply means, a top-up solution supply means, and a means for transferring all its contents into an immediately following pan in said array when the volume of the contents of each pan reaches said associated discharge volume.

2. The system as defined in claim 1 and further including a control means whereby said transferring means operates when the volume of the contents of each pan reaches said associated discharge volume and such that each pan is empty before it received the contents of the immediately preceeding pan in said array.

3. The system as defined in claim 1 in which each pan has a total volume that is greater than the total volume of the immediately preceding pan.

4. The system as defined in claim 1 in which each pan has an associated maximum size of crystal to be grown therein, and each pan volume is proportional to the cube of the maximum size and each pan heat supply means has a heating surface area which is proportional to the square of said maximum size.

5. The system as defined in claim 1 in which said array comprises a vertical stack with the pan of greatest discharge volume or total volume at the bottom of the stack and in which said transferring means includes gravity discharge means.

6. The system as defined in claim 6 in which one or more of said pans comprises an annular shaped trough, said pans being mounted one above the other on a common axis to form said vertical stack, so that the diameter of each pan progressively increases towards the bottom of said stack.

7. The system as defined in claim 7 wherein each annular trough is mounted on the circumference of a central cone shaped compartment.

8. The system as defined in claim 1 wherein said heat supply means comprise steam calandrias and in which each said calandria includes a number of vertically aligned heat transfer tubes positioned in the region of an outer wall of said pan and said number is proportional to the diameter of said pan.

9. The system as defined in claim 1 in which a plurality of said pans are provided with a common vapour space.

10. The system as defined in claim 1 with further includes a heavy-up pan to which the contents of the last pan in said array is transferred and said heavy-up pan has a vapour space which is separate from the vapour space of said vacuum pans.

11. A method of crystallising a substance in which a mixture of crystals and solution of said substance forms the contents of a number of vacuum pans, each pan having an associated discharge volume, said discharge volume being measured as discharge levels of solution head in each pan and all pans being in a sequential array according to increasing discharge volumes, said method including:
   (a) transferring into each pan all said contents from an immediately preceding pan in said array;
   (b) supplying heat to each said contents at rates related to said discharge volumes;
   (c) supplying top-up solution to each said contents;
   (d) measuring physical properties of each said contents and obtaining control parameters from such properties;
   (e) transferring from each pan all said contents into an immediately following pan in said array when said contents in each pan reaches said discharge volume;
   (f) and using said control parameters to control said heat supplying, said top-up supplying, and said transferring so that each said immediately following pan is empty before it receives said contents.

12. The method as defined in claim 11 in which each pan has an associated maximum size crystal to be grown therein and each pan has a heating surface area that is proportional to the square of said maximum size.

* * * * *